Feb. 10, 1953 C. R. WALLER 2,627,717
MULTIPLE GAS TURBINE POWER PLANT HAVING SPEED GOVERNORS
TO BYPASS POWER TURBINE AND REGULATE FUEL FEED
Filed June 11, 1948 4 Sheets-Sheet 1

FIG. I.

INVENTOR.
CARL RICHARD WALLER
BY
ATTORNEYS

INVENTOR.
CARL RICHARD WALLER
BY
ATTORNEYS

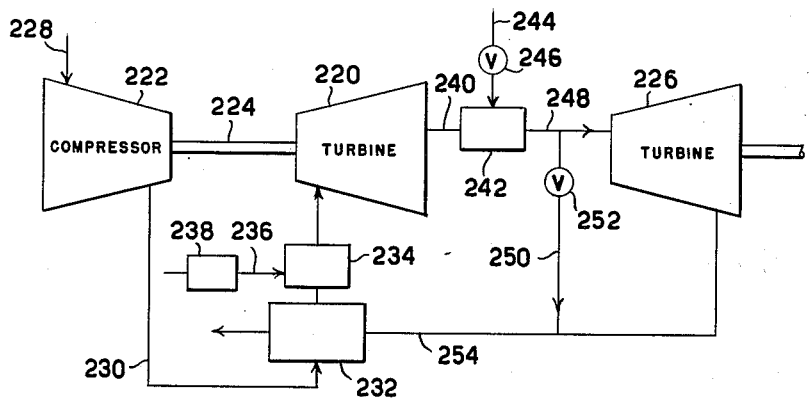
F I G. 4.
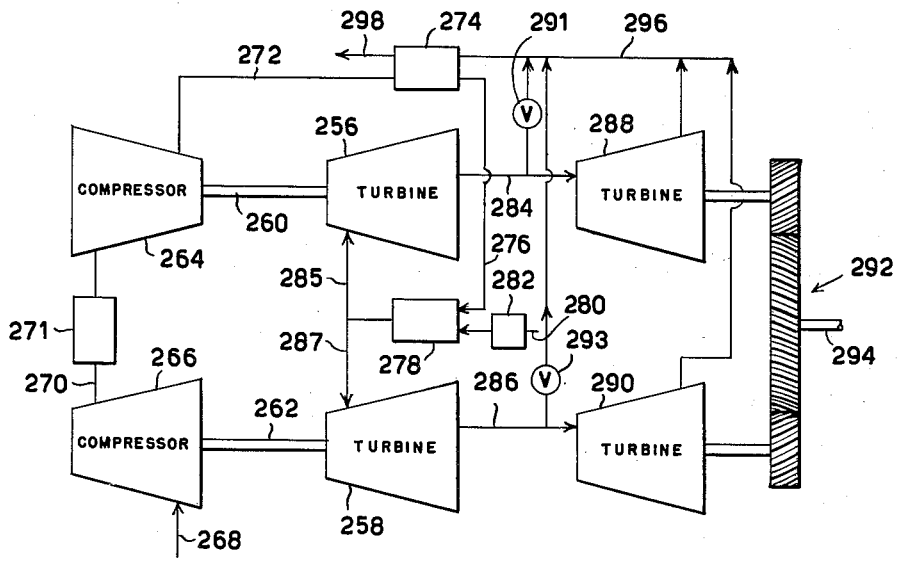
F I G. 5.

Patented Feb. 10, 1953

2,627,717

UNITED STATES PATENT OFFICE 2,627,717

MULTIPLE GAS TURBINE POWER PLANT HAVING SPEED GOVERNORS TO BYPASS POWER TURBINE AND REGULATE FUEL FEED

Carl Richard Waller, Trenton, N. J., assignor to De Laval Steam Turbine Company, Trenton, N. J., a corporation of New Jersey Application June 11, 1948, Serial No. 32,328

3 Claims. (Cl. 60—39.17)

This invention relates to a gas turbine power plant and particularly to a type of gas turbine power plant which is suitable for variable load and/or variable speed operation such as would be required for the driving of locomotives, ships, etc.

Gas turbine power plants in general require a gas generating unit comprising a compressor for supplying air to a fuel burner or combustion chamber thereby to generate the combustion gases. This compressor is most effectively driven by a gas turbine which may be the power turbine but, in general, wherever variable loads and/or speeds are encountered, should be a turbine separate from the power turbine since it is difficult to secure anything approaching satisfactory conditions of operation if the compressor speed is made mechanically dependent upon the speed of the power turbine.

Heretofore, it has been usual to arrange separate power and compressor driving turbines in two general fashions: one of these involving the arrangement of the turbines in stages to receive successively the driving gases, the power turbine being the low, high or some intermediate pressure stage or, secondly, to operate the turbines in parallel so that the gases from the combustion chamber fed by the compressor will be distributed between two or more turbines.

In all of these systems, while employing turbines independent of each other from the standpoint of connecting shafting, nevertheless the turbines are quite dependent in view of either the series arrangement or the distribution of gases between them in parallel. The result is that these systems are relatively unsatisfactory wherever conditions are encountered which are best exemplified as involved in the maneuverability of locomotives or of ships during docking or of tug boats during their operations of handling ships. Under all of these circumstances it is highly desirable to have a system which is capable of continuous operation or of repeated or quickly changed variation between a stopped condition and full speed, with operation at any intermediate speed, and also between very light or no load conditions and full load conditions with operation at any intermediate load.

In accordance with the present invention at least two mechanically independent units are provided, one being a turbine-compressor unit and combustion chamber which operates to supply combustion gases for its own drive and also for the second unit comprising the power turbine. The compressor driving turbine and the power turbine are arranged in series but with the provision of a bypass from the connection between them so that with the bypass fully opened the power turbine may be brought to a standstill desirably with only sufficient gas flowing therethrough to maintain its temperature. Then by closing the bypass it is possible to vary the flow of driving gas to the power turbine to secure operation up to full load and full speed conditions. In this system controls are provided to cause operation to take place automatically in proper fashion. These controls are subject to simple manual manipulation and when such manipulation occurs the entire system reaches a proper condition of efficient operation for the particular situation for which the controls are adjusted. One of these controls may, for example, adjust the governor spring of the power turbine. Under this control the bypass is automatically adjustable by the governor to maintain a desired speed and output of the power turbine. The adjustment of the bypass also affects the operation of the compressor driving turbine because the back pressure thereon is affected by the conditions of the bypass valve. This compressor driving turbine is controlled by a separate governor driven from its shaft, which governor controls the flow of fuel to the burner. This last mentioned governor is also subject to manual control. The supply of fuel is desirably also controlled by the temperature of the combustion gases, this latter control being in the nature of a safety arrangement to limit the maximum temperature attained by these gases. Both controls are also desirably associated with speed limiting devices which will respectively fully open the bypass to stop the power turbine and will cut off the supply of fuel to stop both.

The main object of the present invention is the attainment of the ends indicated above resulting in a gas turbine power plant which is of a highly maneuverable nature.

A further object of the invention is concerned with the provision of an arrangement of the turbines whereby their simple efficient operation, particularly at low loads is secured. Furthermore a compact construction is secured. These ends are attained by mounting the turbines coaxially but upon mechanically independent shafts and close together so that the gases may flow quite directly without bulky connections, from the compressor driving turbine to the power turbine, the bypass being provided from this connection.

Further objects of the invention relate to other details of construction of the various parts including the controls and will become apparent from the following description read in conjunction with the accompanying drawings in which:

Figure 4 is a diagram illustrating a power plant including a regenerator and an auxiliary combustion chamber; and Figure 5 is a diagram illustrating still another power plant having a pair of compressors arranged in series.

Figure 1:
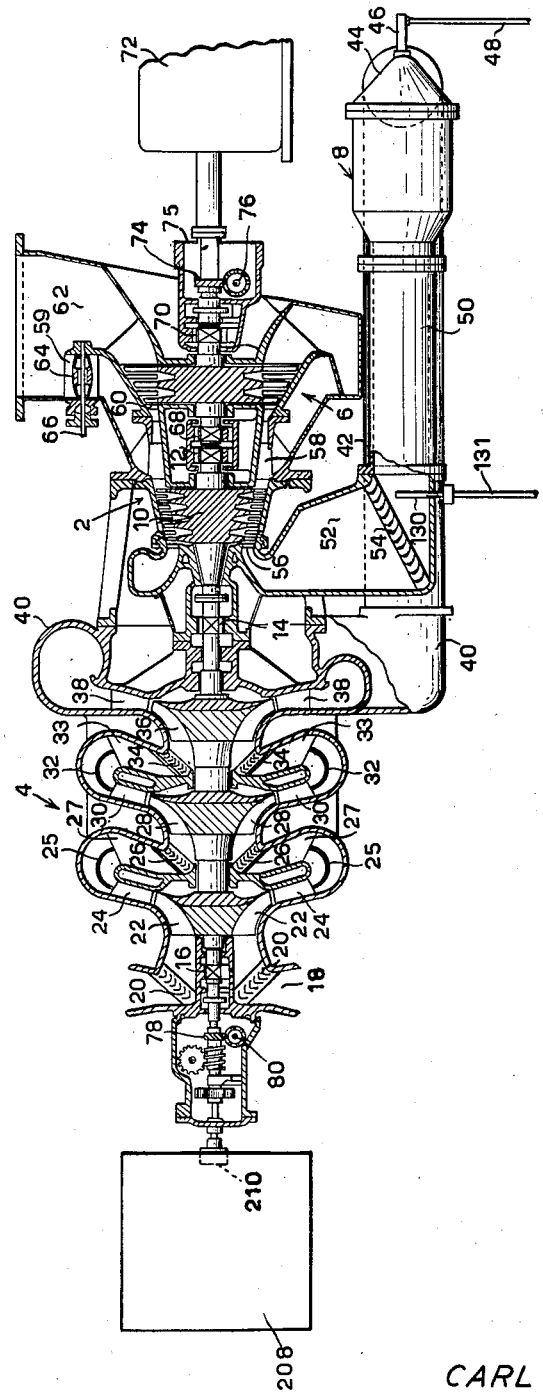
Figure 1 is a diagrammatic sectional view, the major portion of which is taken on a vertical plane through the axes of the two turbines and the compressor.

Referring first to Figure 1, the compressor-driving turbine is indicated at 2, the compressor is indicated at 4 and the power turbine is indicated at 6. A combustion chamber of conventional type is indicated at 8. The rotor 10 of the compressor-driving turbine has its shaft mounted in a bearing 12 and is coupled to the shaft of the compressor 4 which is mounted in bearings at 14 and 16. Air enters the compressor through the passage 18 and is directed through the vanes 20 to the first stage impeller 22 which delivers the air through diffuser 24 redirecting vanes 25, passages 27 and vanes 26 to the second stage impeller 28. This, in turn, delivers the air through diffuser 30, the redirecting passage 32, passages 33 and vanes 34 to a third stage impeller 36 which, in turn, delivers the air through the diffuser 38 into the volute 40 from which the air is delivered through the passage 42 to the inlet end 44 of the combustion chamber 8. The compressor may be of any desired type, and may contain any suitable number of stages.

The products of combustion flow through the passage 50 and are directed by vanes 54 into the gas chest 52 of the turbine 2 passing through the nozzles 56 into the blading of this turbine. The exhaust from the turbine 2 passes into the chamber 58 whence flow occurs through the nozzles 60 into the power turbine 6. Exhaust from the power turbine flows through the exhaust passage 62. Bypass 59 from the passage 58 is controlled by a butterfly or other valve 64 mounted on a shaft 66 which is subject to control as hereafter described. The turbines may be of any suitable type.

The power turbine shaft is mounted in bearings 68 and 70 and is coupled to the driven device which is conventionalized at 72. This may be an electric generator which, for example, in a locomotive, may drive motors connected to the driving wheels; or it may comprise reduction gearing through which direct drive may be effected to the wheels of a locomotive or to a ship's propeller or any other device which is to be driven. A spiral gear 74 on the output shafting of the power turbine drives through a meshing spiral gear a shaft 76 which drives the governor associated with the power turbine. In similar fashion a spiral gear 78 on the turbo-compressor shaft drives through a meshing spiral gear a shaft 80 which drives the governor 82 associated with the turbo-compressor unit.

Figure 2:
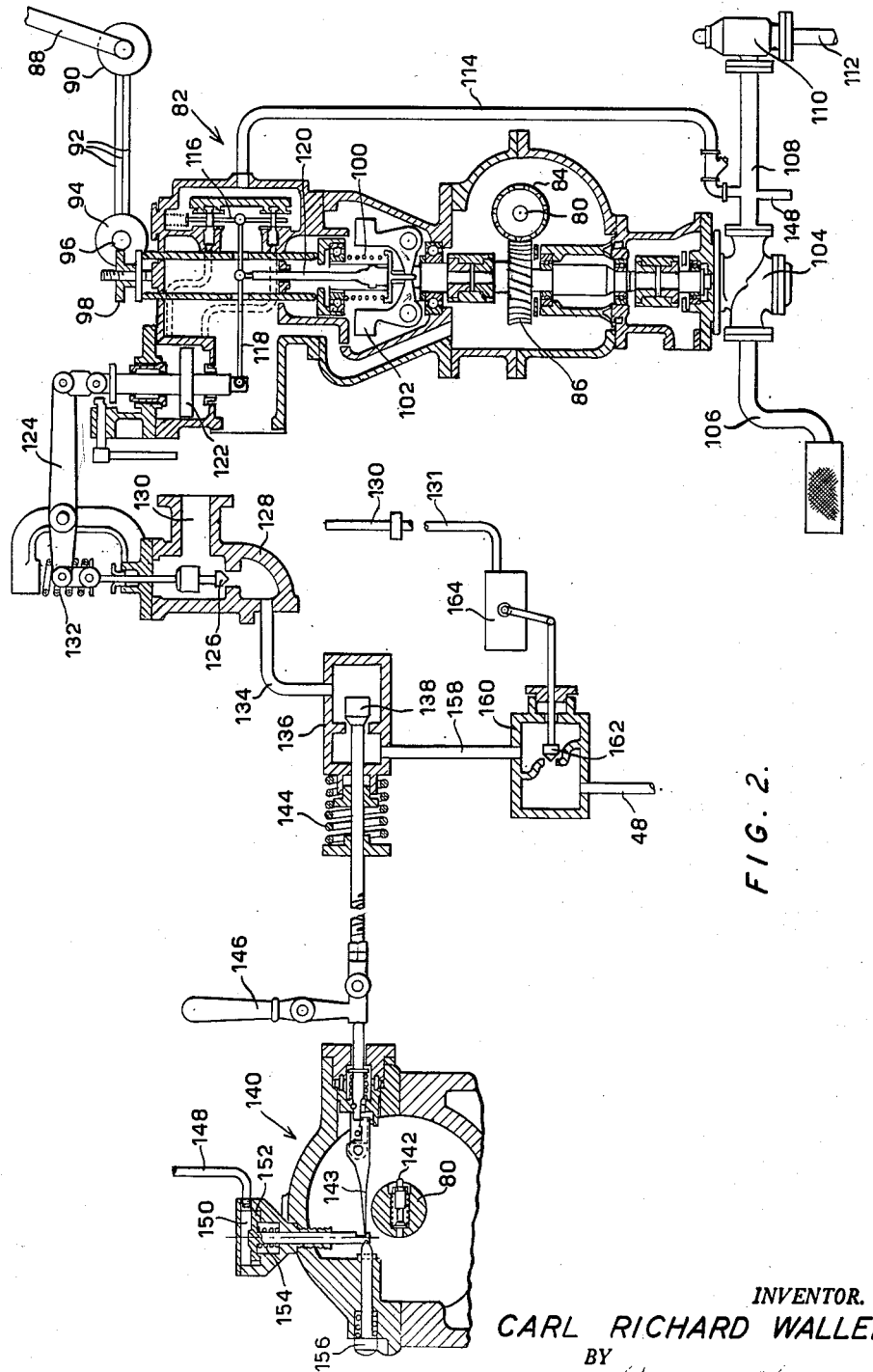
Figure 2 is a diagram, with parts shown in section, illustrating the major controls associated with the compressor-driving turbine.

Referring now to Figure 2 the governor 82 which is illustrated therein is of a conventional type, the vertical shaft thereof being driven through the spiral gears 84 and 86 from the shaft 80. A manual control lever 88 which may be located remote from the governor is arranged to adjust the governor through suitable connections which may be mechanical, pneumatic, or, as illustrated, electrical, involving a selsyn transmitter 90 connected through wires 92 to a selsyn motor 94 which, through a worm 96 and wheel 98 threaded on a fixed screw, may change the tension of the spring 100 which opposes outward movement of the governor weights 102. The governor shaft drives the rotatable elements of a conventional oil pump 104 which constitutes the lubricating oil supply of the entire system receiving oil from a line 106 and delivering it through a line 108 to a pressure reducing valve 110 from which, in turn, the oil is delivered through the line 112 to the parts to be lubricated. From the line 108 there extends the oil line 114 to the pilot valve system indicated at 116 which includes a lever 118 connected to the pilot valve and to the follower 120 controlled by the fly weights 102. This lever 118 is also connected to the piston 122 the flow of oil to and from which is controlled by the pilot valve. The piston 122 is link connected to a lever 124 which controls a valve member 126 in a valve 128 in a fuel oil supply line, the fuel oil entering the valve 128 through the inlet 130. A spring 132 urges the valve element 126 toward closed position. From the valve 128 the fuel oil flows through the connection 134 to a valve 136 provided with a valve element 138.

There is illustrated at 140 an overspeed control of conventional type which includes a portion of the shaft 80 carrying a member 142 which is normally moved inwardly by a spring. If the speed of the shaft 80 exceeds a predetermined limit the member 142 moves outwardly under centrifugal force to trip a latch element 143 which permits the spring 144 to close the valve element 138 and thereby cut off the supply of fuel. A manual resetting lever 146 is provided. The overspeed control is also provided with an arrangement which will cut off the fuel by tripping the element 143 in the event that the lubricating oil pressure to the system fails. This involves a cylinder 150 containing a piston 152 which is held downwardly against the action of a spring 154 so long as oil pressure is delivered through a line 148 which is connected to the output side of the lubricating oil pump. A manual trip for the element 143 is also provided as indicated at 156. From the valve 136 the fuel oil flows through connection 158 to a third valve 160 provided with a valve element 162. This valve element is under control of a temperature responsive element 130 which is located in the passage 50 through which the combustion gases flow. This may be of the liquid filled type connected to a control 164 through a tube 131. This control 164 is connected to the valve element 162 through a suitable linkage so as to close the valve element 162 when the temperature rises beyond a predetermined maximum. The fuel oil from the valve 160 passes through connection 43 to a nozzle 46 through which it is sprayed into the combustion chamber.

The various individual elements illustrated in Figure 2 need not be described in detail since they are quite conventional. These conventional elements include the governor 82, the overspeed limiter 140 and the control device 164, which latter may be of conventional electrical type serving to transform expansion of liquid in the element 130 into a mechanical output controlling the valve element 162.

Figure 3:
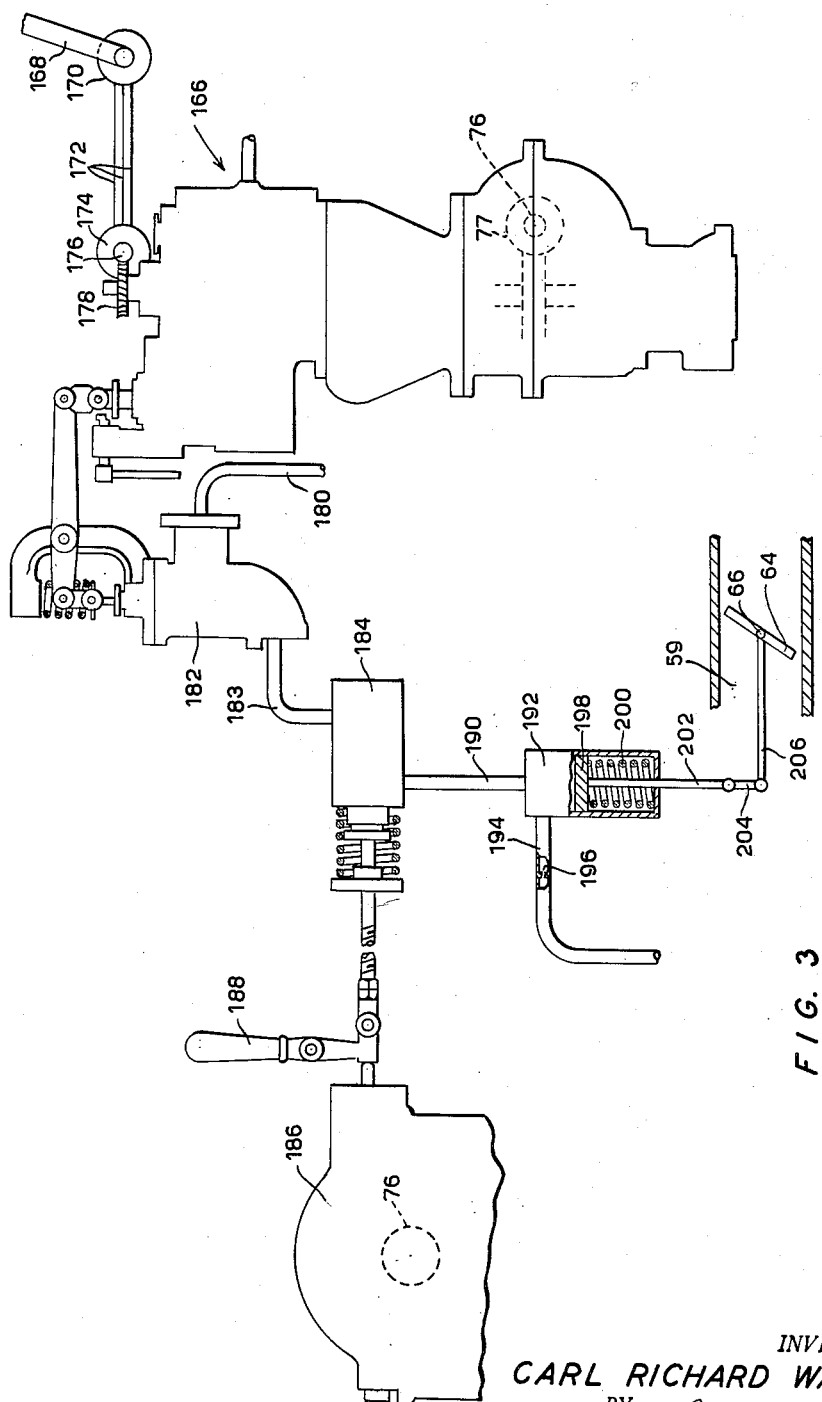
Figure 3 is a similar diagram but showing the major controls associated with the power turbine.

Referring now to Figure 3, the governor associated with the power turbine is illustrated at 166. This governor may be identical in construction with the governor indicated at 82 and hence is not illustrated in detail. It is driven from the shaft 76 through the gearing indicated at 77. A manual control lever 168 is used to adjust the governor spring in the fashion previously indicated through a selsyn transmitter 170, electrical connections 172 and a selsyn motor 174 which effects adjustment through the worm 176 and wheel 178. Mechanical connections may, of course, be here used.

The governor output controls a valve 182 which is similar to valve 128. In this case, however, the valve controls the flow of lubricating oil delivered by the pump 104 under pressure through the oil connection 180. The valve 182 is connected through line 183 to a valve 184 which is similar to valve 136 and is under the control of an overspeed governor 186 controlled by the shaft 76. A resetting lever 188 is provided for this control. The overspeed governor 186 is similar to that previously illustrated and described at 140 with the exception, however, that the elements which respond to failure of lubricating oil pressure are omitted.

From the valve 184 the oil passes through an oil connection 190 to the upper end of a cylinder 192, which upper portion of the cylinder is connected to the oil supply sump through an oil connection 194 containing an orifice 196. A piston 198 in the cylinder 192 is normally held upwardly by a spring 200 and its rod 202 is connected through link 204 to the arm 206 carried by the shaft 66 of the butterfly valve 64 in the bypass passage 59, this valve being diagrammatically indicated in Figure 3. As will be evident from Figure 3 the piston 198 is normally urged upwardly to open the bypass. The degree of closure depends upon the position of the valve element in the valve 182 since this, in conjunction with the orifice 196, will determine the pressure in the upper end of the cylinder 192. The overspeed governor when tripped will, of course, close the inflow of oil to the line 190 and, consequently, the bypass will be then fully opened.

A starting motor 208 may be provided connected to the turbo-compressor shaft through an overrunning clutch 210. This motor may be operated by a battery in conventional fashion, being cut out as soon as the turbo-compressor unit picks up sufficient speed to maintain itself in operation.

For the operation of the system an exposition may be best made assuming that the system is embodied in a locomotive with direct connection of the power turbine to the wheels through reduction gearing. If the locomotive is operating at full speed and full power both of the manual levers 88 and 168 may be set to provide for this full speed and full power condition by such adjustment as will set both governors to operate the system at full speed. With this setting under these conditions the bypass valve 64 will be fully closed and the valve element 126 will be fully opened to supply the maximum flow of fuel to the combustion chamber. This flow of fuel may possibly be limited by the thermometric control 130 acting through the valve element 162.

If now the load decreases while full speed is maintained, with the levers 88 and 168 remaining in the same positions, the system will automatically readjust itself to lower the power output. If it were assumed that the control of the fuel supply were absent these new assumed conditions would involve opening of the bypass valve 64. However, with the control system of Figure 2 provided, the required condition will rather be attained by the partial closure of the valve element 126 to maintain constant the speed of the turbo-compressor unit and the bypass valve will remain closed. This, of course, represents efficient operation since normally it would not be desirable to waste the gases to the atmosphere. If the load becomes very light, however, the bypass valve may partially open which would dictate that for efficient operation the lever 88 should then be manipulated to cut down the fuel supply to the burner. The operator of the locomotive may be provided with a signal which will show the opening of the bypass valve and he would then normally seek to control the turbo-compressor unit to keep this valve closed.

Assuming now that it is desired to operate the locomotive under conditions of starting and stopping for short intervals, rapid starting may be achieved if the turbo-compressor unit is not permitted to slow down to an idling condition. The control lever 88, therefore, will be set to maintain the turbo-compressor unit operating at full speed while in order to effect stopping or slow operation the lever 168 will be set so as to control the bypass valve. With this bypass valve fully opened the power turbine may be brought to rest, only sufficient gas flowing through its passages to maintain its temperature so as to avoid any new heating up period. Then merely by control of the lever 168 the power turbine may be very quickly brought up to full speed. On the other hand, if a prolonged stop is desired the turbo-compressor may be brought to idling-speed by manipulation of the lever 88. As will be evident, the several controls permit great flexibility of operation and these two manual controls alone effect all normal operations of the power plant.

Rapid changes in speed and load are readily obtained with the system described since the power output turbine rotor is not coupled to the power gas generating turbine rotor and hence the moment of inertia of only the power turbine rotor must be overcome in changing speed. In addition, the time lag caused by changes in operating conditions within a power gas generating set is practically eliminated since the power gas generating set may be held at approximately constant conditions, maximum if necessary, during the entire maneuvering period.

As an incident of the mechanical independence of the two turbines good efficiency is achieved under no load conditions. This is particularly desirable in locomotive power plants in which running under no load conditions may occupy a quite substantial portion of the total time of operation.

In cases where efficiency of operation is important the bypass between the turbines may be connected to a heat exchanger in which the exhaust gases exchange heat with the compressed air approaching the combustion chamber. This heat exchanger may be arranged to be bypassed if desired. Figure 4 illustrates a power plant generally similar to that previously described but provided with a regenerator and also with an additional combustion chamber to reheat the gases between the two turbines.

A turbine 220 drives a compressor 222 through the shaft 224. The power turbine is illustrated at 226. The arrangement of these turbines and the compressor may be substantially as previously described. Air enters the compressor at 228 and flows therefrom through the line 230 to the regenerator 232 from which it passes through the combustion chamber 234, receiving fuel through the line 236 subject to the controls of the type previously described which are merely diagrammed in Figure 4 at 238. From the turbine 220 a passage 240 leads to a second combustion chamber 242 to which fuel is introduced through the line 244 containing a valve 246 which may be subject to manual adjustment though automatic adjustment of this valve may be incorporated if desired. The reheated products of combustion pass through the connection 248 to the power turbine 226 but may be bypassed through the connection 250 controlled by a valve 252 of the type previously described and subject to the same type of controls. The gases exhausted from the bypass 250 and from the turbine 226 pass together through the regenerator 232 for the purpose of heating the compressed air. As will be evident from the diagram the functions and operations of the various parts are substantially as previously described there being added the reheater at 242 and the regenerator at 232 to provide in the case of the former additional energy for power turbine and in the case of the latter for increase of efficiency due to utilization of the heat of the exhaust gases.

Figure 5 illustrates diagrammatically a further modification of the invention having a pair of compressors arranged in series and driven by turbines in parallel. A pair of power turbines are also illustrated. In this modification the compressor-driving turbines are indicated at 256 and 258 as driving through shafts 260 and 262 the compressors 264 and 266 respectively the latter being the first stage compressor and the former the second stage compressor. Air entering the compressor 266 at 268 is delivered through connection 270 to the compressor 264 there being, if desired, interposed in the connection 270 an intercooler 271 which may be air cooled in the case of locomotives or stationary plants or water cooled in the case of stationary plants or marine plants. The compressed air from compressor 264 passes through connection 272 to a regenerator 274 whence it flows through connection 276 to the combustion chamber 278 to which fuel is introduced through the line 280 under the control of controlling devices 282 of the type previously described. The combustion gases are directed through connections 285 and 287 to the turbines 256 and 258 from which they are exhausted into the turbines 288 and 290 through the connections 284 and 286. These two turbines which constitute the power turbines may be arranged to drive an output shaft 294 through reduction gearing 292. Bypasses controlled by valves 291 and 293 serve to divert the combustion gases from the turbines 288 and 290 to a line 296 which also receives the combustion gases exhausted from the turbines 288 and 290 and directs them through the regenerator 274 from which they are exhausted at 298. If desired reheating may of course be applied between the first and second stage turbines as illustrated and described in connection with Figure 4. The operation of the power plant of Figure 5 is similar to the operations of the plants previously described through control of the input of fuel through the line 280 and the bypass of combustion gases through the valves 291 and 293.

It is desirable in all of these plants to provide as direct connections as possible between the compressor-driving turbines and the power turbines. It will be obvious that this result may be secured even if additional fuel is introduced for effecting combustion and reheating of the driving gases.

While the invention has been described particularly with respect to a locomotive power plant it will be evident that it is equally applicable to marine and other uses where changes in load and speed of the output are desirably made quite rapidly.

What I claim and desire to protect by Letters Patent is:

1. In combination, means for supplying heated driving gases, means providing fuel to said supplying means, a compressor delivering air to said supplying means, a first turbine driving said compressor, a second turbine having a shaft for delivering useful power, means delivering driving gases from said supplying means to the first turbine to drive the same, means directing driving gases exhausted from the first turbine to the second turbine to drive the latter, a bypass through which driving gases may be diverted from said directing means, a valve controlling said bypass, a first governor driven by the first turbine, means controlled by the operation of the first governor for controlling the supply of fuel through said fuel providing means, the first governor and the means controlled thereby reducing the fuel supply with increase of speed of the first turbine and vice versa, means for adjusting the setting of said first governor to vary the relationship between the fuel supplied and the speed of the first turbine, a second governor driven by the second turbine, means controlled by the operation of the second governor for opening the valve controlling said bypass with increase of speed of the second turbine and vice versa, and means for adjusting the setting of the second governor to vary the relationship of the valve controlling said bypass to the speed of the second turbine.

2. In combination, means for supplying heated driving gases, means providing fuel to said supplying means, a compressor delivering air to said supplying means, a first turbine driving said compressor, a second turbine having a shaft for delivering useful power, means delivering driving gases from said supplying means to the first turbine to drive the same, means directing driving gases exhausted from the first turbine to the second turbine to drive the latter, a bypass through which driving gases may be diverted from said directing means, a valve controlling said bypass, a first governor driven by the first turbine, means controlled by the operation of the first governor for controlling the supply of fuel through said fuel providing means, the first governor and the means controlled thereby reducing the fuel supply with increase of speed of the first turbine and vice versa, means for adjusting the setting of said first governor to vary the relationship between the fuel supplied and the speed of the first turbine, means responsive to temperature of the driving gases for concurrently controlling the supply of fuel through said fuel providing means, a second governor driven by the second turbine, means controlled by the operation of the second governor for opening the valve controlling said bypass with increase of speed of the second turbine and vice versa, and means for adjusting the setting of the second governor to vary the relationship of the valve controlling said bypass to the speed of the second turbine.

3. In combination, means for supplying heated driving gases, means providing fuel to said supplying means, a compressor delivering air to said supplying means, a first turbine driving said compressor, a second turbine having a shaft for delivering useful power, means delivering driving gases from said supplying means to the first turbine to drive the same, means directing driving gases exhausted from the first turbine to the second turbine to drive the latter, a bypass through which driving gases may be diverted from said directing means, a valve controlling said bypass, a first governor driven by the first turbine, means controlled by the operation of the first governor for controlling the supply of fuel through said fuel providing means, the first governor and the means controlled thereby reducing the fuel supply with increase of speed of the first turbine and vice versa, a first manually operated means for adjusting the relationship between the fuel supplied and the speed of the first governor, a second governor driven by the second turbine, means controlled by the operation of the second governor for opening the valve controlling said bypass with increase of speed of the second turbine and vice versa, and a second manually operated means for adjusting the relationship of the valve controlling said bypass to the speed of the second governor.

CARL RICHARD WALLER.

REFERENCES CITED

The following references are of record in the file of this patent:

UNITED STATES PATENTS

| Number | Name | Date |
| --- | --- | --- |
| 2,073,191 | Belluzzo | Mar. 9, 1937 |
| 2,095,991 | Lysholm | Oct. 19, 1937 |
| 2,219,994 | Jung | Oct. 29, 1940 |
| 2,243,467 | Jendrassik | May 27, 1941 |
| 2,280,765 | Anxionnaz et al. | Apr. 21, 1942 |
| 2,353,929 | Ray | July 18, 1944 |
| 2,371,889 | Hermitte | Mar. 20, 1945 |
| 2,372,686 | Sédille | Apr. 3, 1945 |
| 2,399,046 | Larrecq | Apr. 23, 1946 |
| 2,418,911 | Smith | Apr. 15, 1947 |
| 2,476,179 | Cameron | July 12, 1949 |
| 2,529,973 | Sédille et al. | Nov. 14, 1950 |
| 2,544,235 | Pfenninger | Mar. 6, 1951 |
| 2,587,057 | McVeigh | Feb. 26, 1952 |
| 2,587,649 | Pope | Mar. 4, 1952 |